(12) United States Patent
Poole et al.

(10) Patent No.: US 6,771,588 B2
(45) Date of Patent: Aug. 3, 2004

(54) PROTECTIVE COVER FOR OPTICALLY READ DIGITAL DISKS

(75) Inventors: Daniel L. Poole, Glendale, AZ (US); Robert N. Poole, Scottsdale, AZ (US)

(73) Assignee: D-, West Chicago, IL (US)

( * ) Notice: Subject to any disclaimer, the term of this patent is extended or adjusted under 35 U.S.C. 154(b) by 55 days.

(21) Appl. No.: 10/186,514

(22) Filed: Jul. 1, 2002

(65) Prior Publication Data

US 2004/0001425 A1 Jan. 1, 2004

(51) Int. Cl.[7] ............................ G11B 3/70; G11B 17/03
(52) U.S. Cl. ........................................ 369/291; 720/719
(58) Field of Search ........................... 369/291, 283, 369/296, 284, 290; 720/719, 745, 746

(56) References Cited

U.S. PATENT DOCUMENTS

| | | | |
|---|---|---|---|
| 4,556,968 A | * 12/1985 | Pelkey et al. | ................ 369/287 |
| 4,590,493 A | * 5/1986 | Inoue et al. | ................ 369/284 |
| 4,672,600 A | 6/1987 | Balston et al. | |
| 5,787,069 A | 7/1998 | Lowe et al. | |
| 5,872,768 A | * 2/1999 | Shtipelman et al. | ........ 369/291 |
| 5,912,875 A | 6/1999 | Lowe et al. | |
| 6,013,352 A | * 1/2000 | Gallant | ........................ 369/283 |
| 6,054,009 A | 4/2000 | Cote et al. | |
| 6,077,583 A | 6/2000 | Park | |
| 6,192,025 B1 | 2/2001 | Chen | |
| 6,249,509 B1 | 6/2001 | Hirata et al. | |
| 6,309,727 B1 | 10/2001 | Mueller et al. | |
| 6,385,164 B1 | * 5/2002 | Winicki | ...................... 369/291 |

* cited by examiner

*Primary Examiner*—Allen Cao
(74) *Attorney, Agent, or Firm*—Parsons & Goltry; Robert A. Parsons; Michael W. Goltry

(57) ABSTRACT

A protective cover for protecting a read side of an optical disk, the protective cover including a substantially planar body being transparent and having a center hole, an outer edge and a generally planar annular surface extending between the outer edge and the center hole. A circumferential engagement structure is coupled to the outer edge of and completely encircles the planar body for engaging an outer edge of the optical disk.

11 Claims, 5 Drawing Sheets

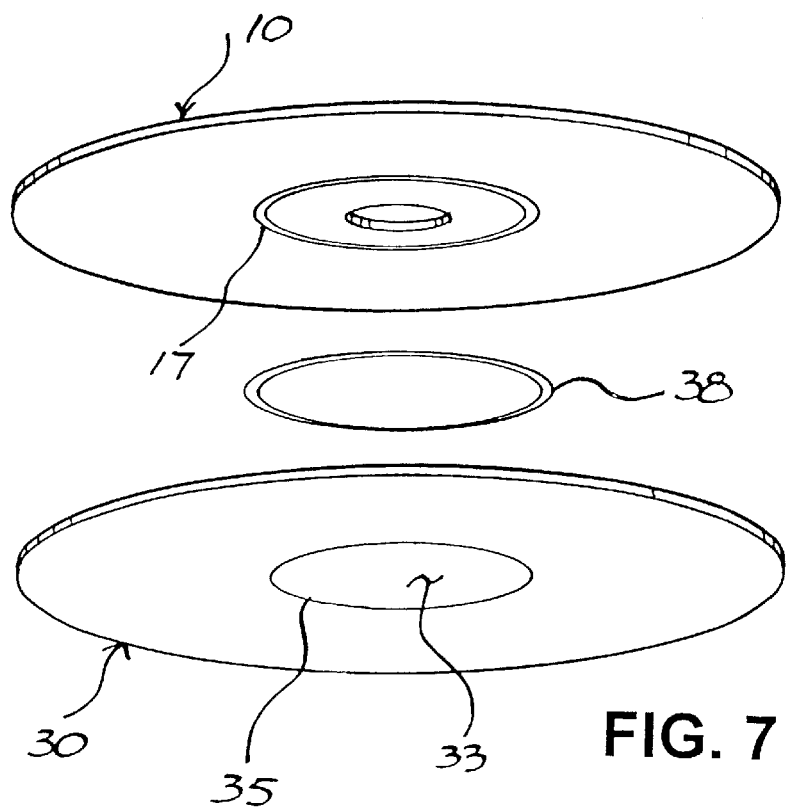
FIG. 7
FIG. 8
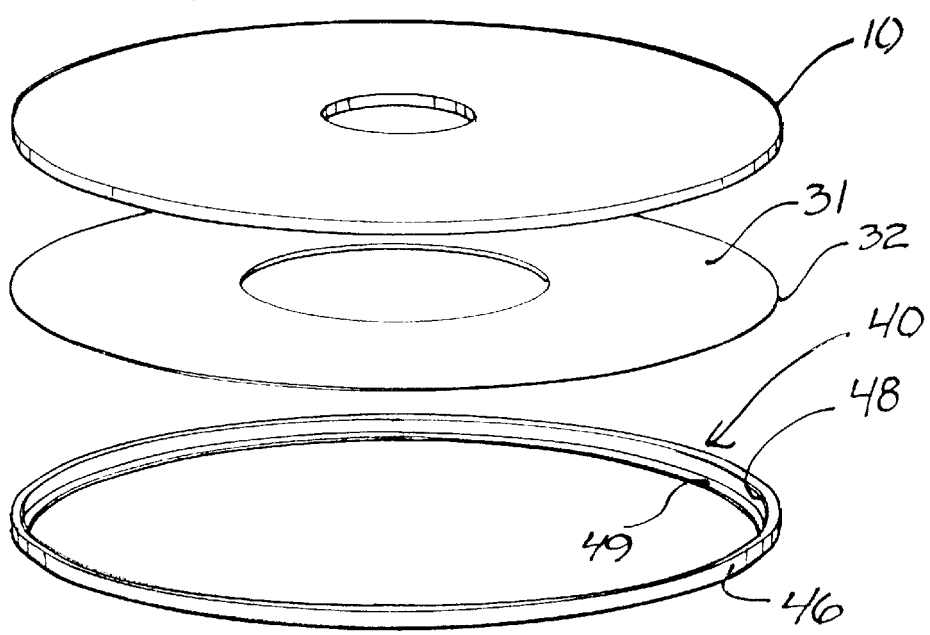

PROTECTIVE COVER FOR OPTICALLY READ DIGITAL DISKS

FIELD OF THE INVENTION

This invention relates to data storage devices.

More particularly, the present invention relates to protecting data storage devices.

In a further and more specific aspect, the instant invention concerns protective covers for optically read disks.

BACKGROUND OF THE INVENTION

Disks which are read optically store digital data in the form of microscopic pits on a bottom surface thereof. These disks include CDs, CD-ROM, CD-RW, DVDs etc. The encoded data is read using a laser which is typically projected through a transparent protective surface integrally formed on the lower surface of the disk. Damage or contamination of the protective surface can result in distortion of the read data.

To prevent damage to the disks protective covers have been developed. Many of the protective covers must be removed before the disk can be read. This is a substantial inconvenience and provides a window of time, just prior to insertion into a reading device, when damage can occur. To overcome this problem, covers have been developed which are intended to be kept in place when reading the disk. While this is a desirable goal, the protective covers have many problems.

As an example, a prior art cover includes several clips spaced around the periphery thereof to receive and engage the outer periphery of a disk. While the cover is adequately held in place, the cover and disk are often difficult to position in a read device, and are often caught or snagged when inserted into automatic feed readers, resulting in malfunctions. Another cover includes a sheet material having two sided tape positioned on an inner portion around a central opening. The tape adheres the inner edge of the cover to the disk. Again, when inserting the disk and cover into an automatic feed device, such as a automotive CD player, the loose outer edge of the cover can catch on the inlet of the device. This can jam the player, fold or otherwise damage the cover and prevent reading of the data on the disk.

It would be highly advantageous, therefore, to remedy the foregoing and other deficiencies inherent in the prior art.

Accordingly, it is an object of the present invention to provide a new and improved protective cover for an optically read disk.

Another object of the invention is to provide a protective cover which can remain in position during reading of the data stored thereon.

And another object of the invention is to provide a protective cover which can be used on substantially any disk.

Still another object of the present invention is to provide a protective cover which is easily installed and replaced.

SUMMARY OF THE INVENTION

Briefly, to achieve the desired objects of the instant invention in accordance with a preferred embodiment thereof, provided is an optical disk including an outer edge, a center hole, a surface having a readable portion intermediate the outer edge and the center hole and a protruding ring projecting from the surface intermediate the center hole and the readable portion. A protective cover removably covers the surface of the disk. The protective cover includes a generally planar body having a center hole, an outer edge and a generally planar annular surface extending between the outer edge and the center hole and corresponding to and covering the surface of the disk. A circumferential engagement structure is carried by the body and engages the disk.

In a specific embodiment, the engagement structure includes a substantially upright sidewall terminating in a radially inwardly directed lip extending substantially completely around a periphery of the body. In another embodiment, the engagement structure includes a generally flexible sidewall extending substantially completely around a periphery of the body, the sidewall leaning radially inwardly.

In a further embodiment, the circumferential engagement structure includes a sidewall and an adhesive ring encircling the body and carried by the annular surface extending from proximate the outer edge radially inwardly. Alternatively, the circumferential engagement structure includes a sidewall and an adhesive ring encircling the body and carried by the annular surface proximate the center hole and extending radially outwardly.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 7 is an exploded view of a disk and yet another embodiment of a disk cover according to the present invention;

FIG. 8 is an exploded view of a disk and a further embodiment of a disk cover according to the present invention.

DETAILED DESCRIPTION OF THE PREFERRED EMBODIMENT

Figure 1:
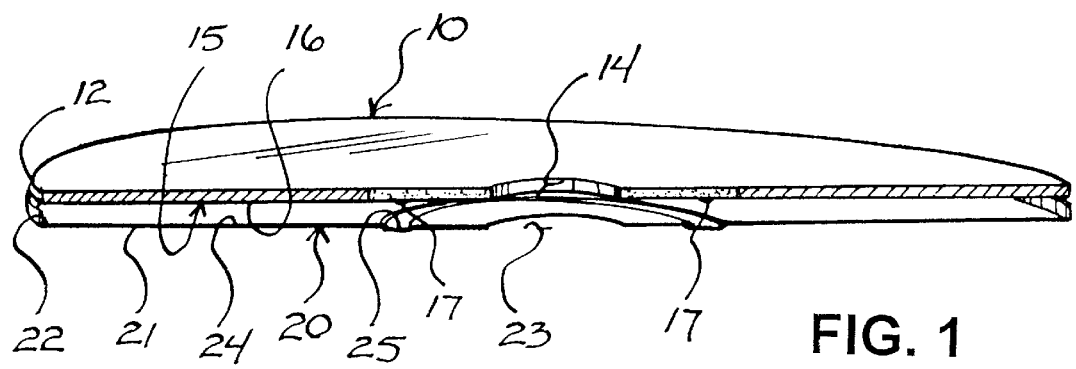
FIG. 1 is a sectional exploded view in perspective of a disk and a protective disk cover according to the present invention.
Figure 2:
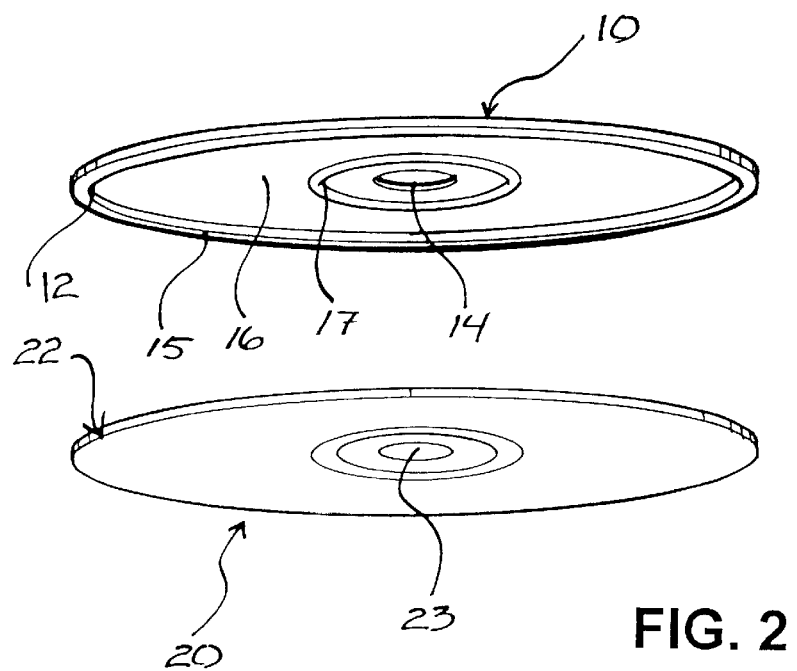
FIG. 2 is an exploded perspective view of the disk and disk cover of FIG. 1.

Turning now to the drawings in which like reference characters indicate corresponding elements throughout the several views, attention is first directed to FIGS. 1 and 2 which illustrates an optical disk 10, having an outer edge 12, a center hole 14, a surface 15 having a readable portion 16, and a protruding ring 17 projecting from surface 15. Protruding ring 17 encircles center hole 14 and is positioned intermediate readable portion 16 and center hole 14. Protruding ring 17 is variably positioned between readable portion 16 and center hole 14, the diameter thereof depending upon the manufacturer. Details of disk 10 will not be elaborated upon, as they are well known in the art. It will be understood that disk 10 can be substantially any type of optically read digital data disk, such as CD, DVD, CD-ROM, mini disks, etc.

Figure 4:
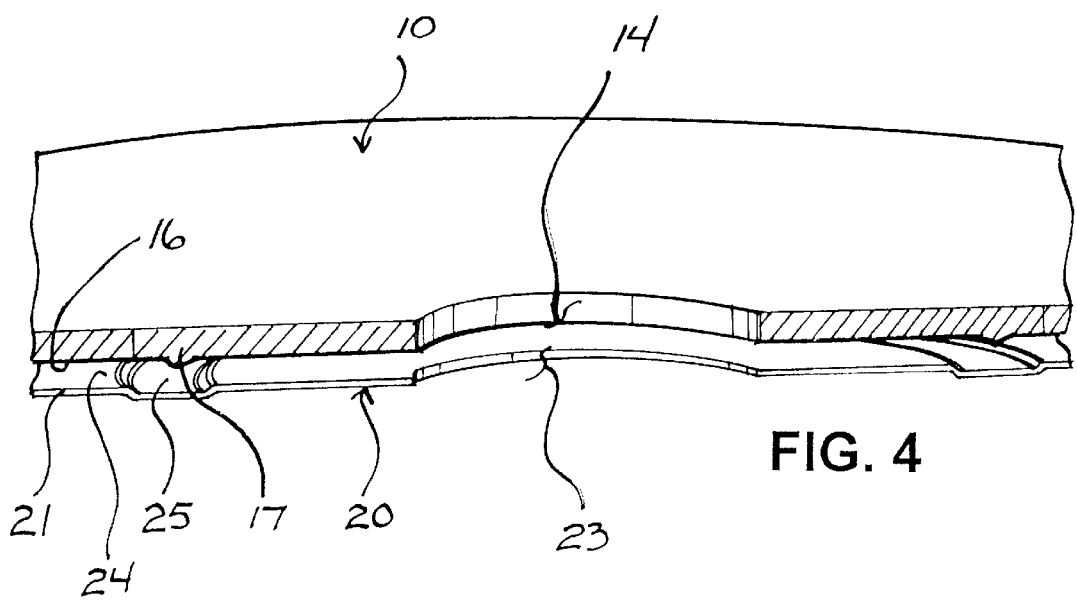
FIG. 4 is an enlarged partial sectional view of a central area of the disk and disk cover.
Figure 5:
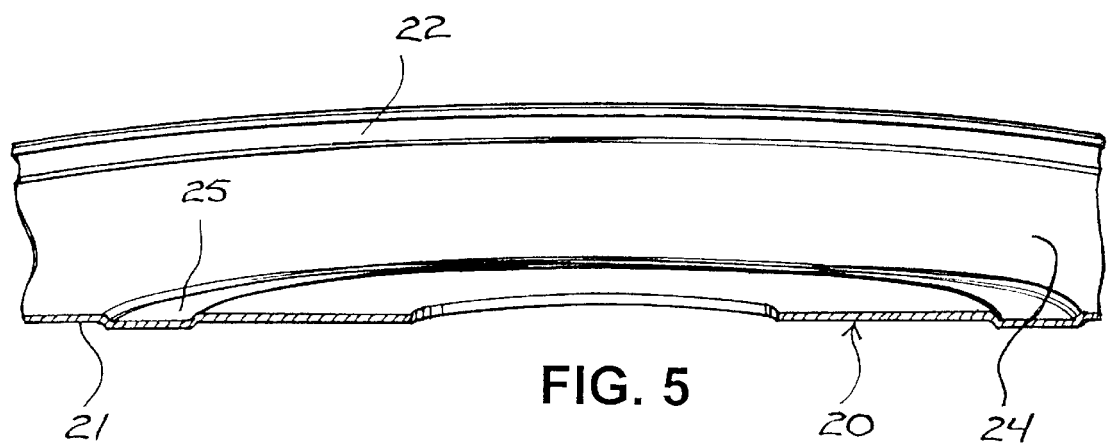
FIG. 5 is an enlarged partial sectional view of the central portion of the disk cover.

Still referring to FIGS. 1 and 2, a protective disk cover, generally designated 20 is illustrated overlying surface 15. Cover 20 includes a generally planar body 21, circumferential engagement structure 22, and a center hole 23. Body 21 includes a generally planar annular surface 24 extending between structure 22 and center hole 23. Surface 24 corresponds to and is for covering surface 15 of disk 10. Center hole 23 is formed to closely correspond to center hole 14 of disk 10, although some variation can occur. With additional reference to FIGS. 4 and 5, a groove 25 is formed in surface 24, proximate and encircling center hole 23 to receive protruding ring 17 of disk 10. Groove 25 has a width sufficient to receive protruding rings of various diameters, providing a feature able to accommodate a range of variations present in the diameter of protruding rings on optical disks, with the outer edge of groove 25 stopping short of readable portion 16.

Figure 3:
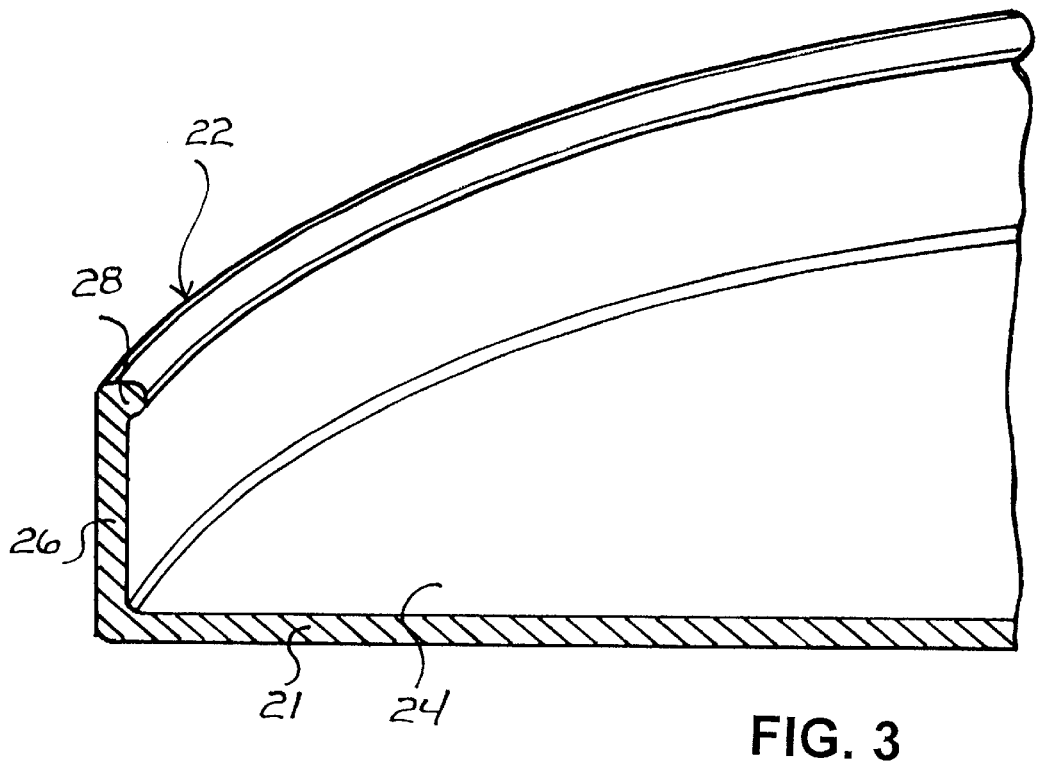
FIG. 3 is an enlarged partial sectional view of the disk cover of FIGS. 1 and 2.

Still referring to FIGS. 1 and 2, with additional reference to FIG. 3, circumferential engagement structure 22 includes a sidewall 26 extending from and substantially upright with respect to body 21 and terminating in a radially inwardly directed lip 28. Sidewall 26 and lip 28 extend substantially around the entire periphery of body 21. Sidewall 26 is of a height substantially identical to the thickness of disk 10. In this manner, cover 20 can be snapped over the readable side of disk 10 with lip 28 engaging disk 10 substantially completely around the periphery. Engagement structure 22 and/or body 21 are sufficiently flexible to allow momentary distortion of the structure and allow lip 28 to engage the rim of a disk.

Figure 6:
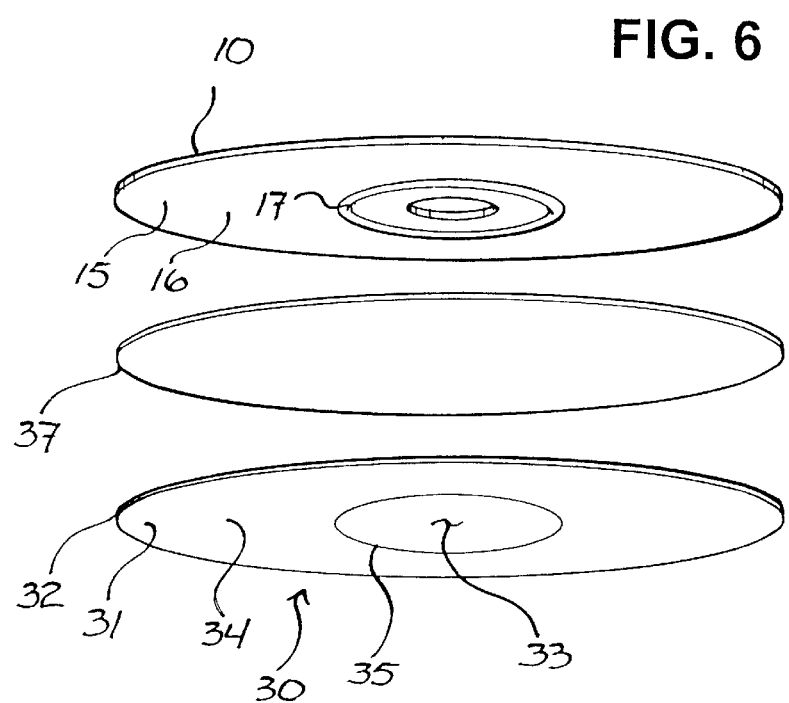
FIG. 6 is an exploded view of a disk and another embodiment of a disk cover according to the present invention.

Turning now to FIG. 6, another embodiment of a protective disk cover, generally designated 30 is illustrated overlying surface 15 of disk 10. Cover 30 includes a generally planar body 31, and outer edge 32, and a center hole 33. Body 31 includes a generally planar annular surface 34 extending between outer edge 32 and center hole 33. Surface 34 corresponds to and is for covering surface 15 of disk 10. Center hole 33 is enlarged to receive protruding ring 17 of disk 10. Center hole 33 has a diameter sufficient to receive protruding rings of various diameters, providing a feature able to accommodate the range of variations present in the diameter of protruding rings on optical disks, with an edge 35 of center hole 33 stopping short of readable portion 16.

Still referring to FIG. 6, a circumferential engagement structure 37 is also provided with protective cover 30. In this embodiment, structure 37 is an adhesive ring carried by outer edge 32 encircling cover 30 and extending radially inward to a position proximate readable portion 16. Adhering the outer edge prevents ingress of dust, moisture, etc. from intruding through the outer edge. It will be understood that a structure similar to structure 22 can also be included to act as a locator for the disk.

Turning now to FIG. 7, another embodiment of a circumferential engagement structure 38 can be employed. In this embodiment, structure 38 is an adhesive ring carried by edge 35 encircling center hole 33 and extending radially outwardly to a position proximate readable portion 16. The adhesive ring of structure 38 is adhered to disk 10 radially outwardly of protruding ring 17. This prevents distortion of the various elements. The use of both structure 37 and structure 38 is contemplated and will protect readable portion 16 from all outside conditions. It will be understood that a structure similar to structure 22 can also be included to act as a locator for the disk.

Referring to FIG. 8, yet another embodiment of a circumferential engagement structure 40 can be employed. In this embodiment, structure 40 includes a sidewall 46 extending from and substantially upright with respect to body 31 and terminating in a radially inwardly directed lip 48. A flange 49 extends perpendicularly and radially inwardly from a base of sidewall 46 so as to receive body 31 thereon. Body 31 overlies flange 49 such that flange 49 engages outer edge 32 and extends radially inwardly to a position short of readable portion 16 when disk 10 is in position. Sidewall 46 and lip 48 extend substantially around the entire periphery of body 31. Sidewall 46 is of a height substantially identical to the thickness of disk 10. In this manner, cover 20 can be snapped over the readable side of disk 10 with lip 48 engaging disk 10 substantially completely around the periphery.

Figure 9:
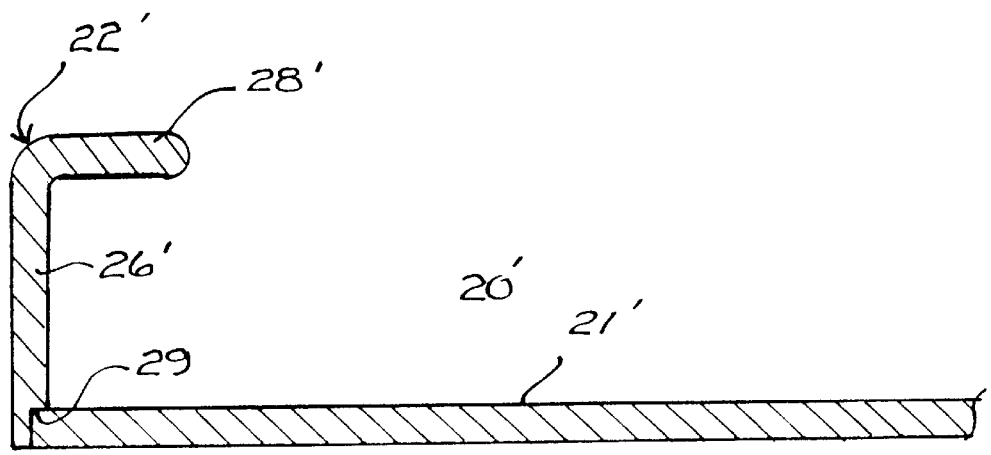
FIG. 9 is an enlarged partial sectional side view of yet another embodiment of an engagement structure of the disk cover.

Referring now to FIG. 9, another embodiment of a protective disk cover, generally designated 20' is illustrated. The elements of cover 20' generally include the same elements as cover 20, and are therefore not described in detail. The elements that are referred to are designated with a prime. Cover 20' includes a body 21' and engagement structure 22'. Cover 20' differs from cover 20 in that instead of being a unitary structure, body 21' is formed of flat sheet material to which engagement structure 22' is bonded, overmolded, sonic welded, etc. In this embodiment, structure 22' includes a sidewall 26' extending from and substantially upright with respect to body 21' and terminating in a radially inwardly directed lip 28'. A notch 29 is formed in a base of sidewall 26' so as to receive an outer edge of body 21' therein. By overmolding structure 22' to body 21', two different materials can be employed for each, such as TPE, Saneprene or other flexible or slightly elastomeric material for structure 22', which need not be transparent, and polycarbonate or other harder transparent material for body 21'. The shape of the junction between structure 22' and body 21' can be altered as necessary to increase the bonding surface to provide a stronger bond.

Figure 10:
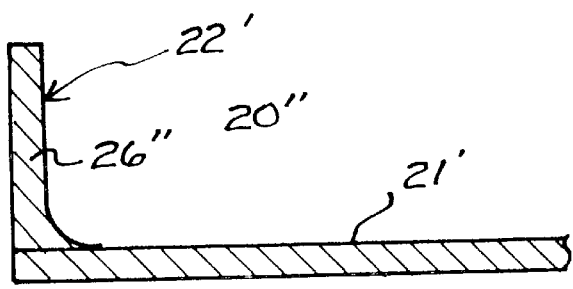
FIG. 10 is an enlarged partial sectional side view of another embodiment of an engagement structure of the disk cover as it would appear during the overmolding process.
Figure 11:
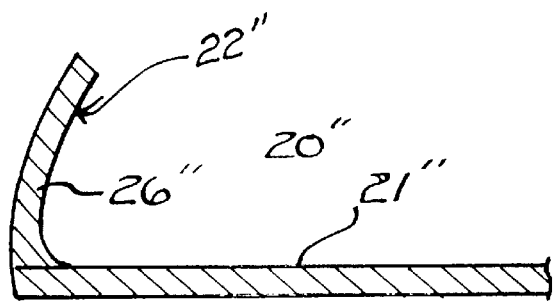
FIG. 11 is an enlarged partial sectional side view of the engagement structure of FIG. 10 as it would appear removed from the mold and the sidewall drawn inwardly.

Turning to FIGS. 10 and 11, FIG. 10 illustrates yet another embodiment of a cover generally designated 20", showing overmolding of a structure 22" to a body 21" of flat sheet stock. In this embodiment, structure 22" is formed of TPE and includes a thickened base having a radius to provide a larger surface holding area. As can be seen, structure 22" essentially includes only a sidewall 26" without a lip. After the overmolding process and ejection of the cover from the mold, as seen with reference to FIG. 11, sidewall 26" will shrink and draw radially inwardly. The flexible nature of structure 22" will allow a disk to be inserted to a position overlying body 21", while the inward bend of sidewall 26" will engage and hold the disk in position.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

What is claimed is:

1. A protective cover for protecting a read side of an optical disk comprising:
    a substantially planar body being transparent and having a center hole, an outer edge and a generally planar annular surface extending between the outer edge and the center hole; and
    a circumferential engagement structure including a sidewall having a base end, an opposing end and a flange extending radially inwardly from the base end of the sidewall, an outer surface of the flange coupled to the annular surface at the outer edge of and substantially completely encircling the planar body for engaging an outer edge of the optical disk.

2. A protective cover as claimed in claim 1 wherein the sidewall terminates at the opposing end in a radially inwardly directed lip extending substantially completely around a periphery of the body.

3. A protective cover as claimed in claim 1 wherein the engagement structure includes a the sidewall extending substantially completely around a periphery of the body, the sidewall terminating at the opposing end in periodic inwardly directed tabs.

4. A protective cover as claimed in claim 1 wherein there is no spacer extending from the planar body radially inwardly from the circumferential engagement structure, for allowing the planar body to reside against the readable portion of the optical disk.

5. A protective cover for protecting a read side of an optical disk comprising:
    a generally planar body having a center hole, an outer edge and a generally planar annular surface extending between the outer edge and the center hole;
    a circumferential engagement structure carried by the body and including a substantially upright sidewall extending substantially completely around the outer edge of the body; and
    wherein the planar body and the sidewall are fabricated of different materials.

6. A protective cover as claimed in claim 5 wherein the circumferential engagement structure further includes the substantially upright sidewall terminating in a radially inwardly directed lip.

7. A protective cover as claimed in claim 5 wherein the circumferential engagement structure includes a sidewall having a base end, an opposing end and a flange extending radially inwardly from the base end of the sidewall, an outer surface of the flange is coupled to the annular surface at the outer edge of and substantially completely encircling the planar body.

8. A protective cover as claimed in claim 5 wherein there is no spacer extending from the planar body radially inwardly from the circumferential engagement structure, for allowing the planar body to reside against the readable portion of the optical disk.

9. An optical disk comprising:
    an outer edge;
    a center hole;
    a surface having a readable portion intermediate the outer edge and the center hole;
    a protective cover removably covering the surface, the protective cover comprising:
        a generally planar body having a center hole, an outer edge and a generally planar annular surface extending between the outer edge and the center hole and corresponding to and covering the surface of the disk;
        a circumferential engagement structure carried by the body and engaging the disk, the circumferential engagement structure including a sidewall having a base end, an opposing end, and a flange extending radially inwardly from the base end, the annular surface at the outer edge of the planar body coupled to an outer surface of the flange, with the sidewall substantially completely encircling the planar body for engaging an outer edge of the optical disk; and
    Wherein the planar body resides against the readable portion of the optical disk.

10. An optical disk as claimed in claim 9 wherein the circumferential engagement structure includes the sidewall terminating in a radially inwardly directed lip extending substantially around the entire periphery of the body.

11. An optical disk as claimed in claim 10 wherein the sidewall is of a height substantially identical to a thickness of the disk.

* * * * *

UNITED STATES PATENT AND TRADEMARK OFFICE
CERTIFICATE OF CORRECTION

PATENT NO.      : 6,771,588 B2  
DATED           : August 3, 2004  
INVENTOR(S)     : Poole, Daniel L. and Poole, Robert N.

It is certified that error appears in the above-identified patent and that said Letters Patent is hereby corrected as shown below:

Title page,
Item [73], Assignee, change "D_-," to -- D_SKIN LLC --.

Signed and Sealed this

Sixteenth Day of November, 2004

*JON W. DUDAS*
*Director of the United States Patent and Trademark Office*